Patented May 16, 1933

1,909,816

UNITED STATES PATENT OFFICE

ALFRED DIERICHS, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

ACETIC ANHYDRIDE

No Drawing. Application filed January 21, 1930, Serial No. 422,379, and in Germany January 28, 1929.

The present invention relates to the thermal decomposition of acetic acid into acetic anhydride and water and to a new catalyst for this decomposition.

It is known that acetic anhydride is produced catalytically from glacial acetic acid; the technically important catalysts used therefor are alkali metal phosphates, which involve the disadvantage that they become alkaline owing to the separation of phosphoric acid, and thus cause the acetic acid to be split up into carbon, methane and carbon dioxide. Since the alkalinity of the catalyst steadily rises the decomposition of the acetic acid vapor increases accordingly so that after some hours the catalyst becomes practically useless.

I have found that catalysts containing boron phosphate—a complex compound of boric acid anhydride and phosphorous pentoxide—besides alkali metal salts especially alkali metal phosphates, last much longer than the catalysts used heretofore. These new catalysts have the further advantage that only a slight decomposition of the acetic acid by splitting off of carbon is produced and that this carbon can be removed from the catalyst by igniting it in the air. The catalysts form white porous melts which catalyze the production of anhydride from acetic acid vapor at about 400 to about 800° C.

The preparation of the catalysts is performed in the most simple manner by thoroughly heating the mixture of the above mentioned components for some time, say about one hour, at between about 600 to about 900° C. Another way for preparing the catalysts consists in dissolving the alkali metal salts in water, then adding the boron phosphate, evaporating the solution to dryness on the water bath and heating the substance so obtained as described above.

As alkali metal salts I prefer to use phosphates, but also carbonates, borates, hydroxides and so on may be used with the same effect.

The invention is illustrated by the following examples without being limited thereto:

*Example 1.*—200 g. of acid sodium ammonium phosphate are dissolved in 2 liters of water and 1 kg. of boron phosphate is added to the solution. By evaporating the solution on the water bath and heating the residue in a crucible to 700° C. a porous white substance is obtained.

Acetic acid vapor is passed over this substance at 600–620° C. with a velocity of 1.5 kg. per hour. A yield of 48–50% of acetic anhydride is thus obtained calculated on the initial acetic acid.

*Example 2.*—100 g. of sodium ammonium phosphate of the formula $NaNH_4HPO_4$ and 100 g. of primary lithium phosphate are dissolved in 2 liters of water. 1 kg. of boron phosphate is added. After evaporation the product thus obtained is heated in a crucible to 700° C. A porous white substance is obtained which when used as a catalyst as described in Example 1 leads to the same yield.

*Example 3.*—200 g. of borax are dissolved in 2 liters of water and 1 kg. of boron phosphate is added. After evaporation, heating is effected to 700° C. A porous white product is obtained which when employed as a catalyst as described in Example 1, gives the same result.

*Example 4.*—100 g. of sodium hydroxide and 100 g. of lithium hydroxide are dissolved in 2 liters of water and 1 kg. of boron phosphate is added to this solution; after evaporation on the water bath the residue thus obtained is calcined at 1,000° C.; a porous white product is obtained. This product when employed as described in Example 1 leads to the same yield.

*Example 5.*—100 g. of finely powdered boron phosphate, 100 g. of finely powdered sodium meta phosphate and 100 g. of finely powdered lithium meta-phosphate are well mixed and heated for about one hour to about 800 to about 900° C. A clear melt is obtained, which begins to soften at 450° C. and which is easily fusible above this temperature.

By passing acetic acid vapor through the molten catalyst at temperatures between about 700 and about 750° C. 50 to 60% of the theory of acetic anhydride are obtained.

I claim:

1. Process for preparing acetic anhydride comprising passing a current of acetic acid vapor over a catalyst consisting of a mixture of boron phosphate and at least one alkali metal salt at a temperature of between about 400 and about 800° C.

2. Process for preparing acetic anhydride comprising passing a current of acetic acid vapor over a catalyst consisting of a mixture of boron phosphate and at least one alkali metal phosphate at a temperature of between about 400 and about 800° C.

3. Process for preparing acetic anhydride comprising passing a current of acetic acid vapor over a catalyst consisting of a molten mixture of 1 part of boron phosphate, 1 part of sodium meta phosphate and 1 part of lithium meta phosphate at a temperature of between about 700 and about 750° C.

4. Process for preparing acetic anhydride, comprising passing a current of acetic acid vapor over a catalyst consisting of a mixture of 200 parts of acid sodium ammonium phosphate and 1000 parts of boron phosphate at a temperature of between about 700 and about 750° C.

5. Process for preparing acetic anhydride, comprising passing a current of acetic acid vapor over a catalyst consisting of a mixture of 100 parts of acid sodium ammonium phosphate, 100 parts of primary lithium phosphate and 1,000 parts of boron phosphate at a temperature of between about 700 and about 750° C.

In testimony whereof I have hereunto set my hand.

ALFRED DIERICHS.